United States Patent [19]

Amro

[11] Patent Number: 5,797,139

[45] Date of Patent: Aug. 18, 1998

[54] METHOD, MEMORY AND APPARATUS FOR DESIGNATING A FILE'S TYPE BY BUILDING UNIQUE ICON BORDERS

[75] Inventor: Hatim Yousef Amro, Austin, Tex.

[73] Assignee: International Business Machines Corporation, Armonk, N.Y.

[21] Appl. No.: 572,476

[22] Filed: Dec. 14, 1995

[51] Int. Cl.⁶ .................................................. G06F 17/30
[52] U.S. Cl. ....................... 707/100; 707/101; 345/348; 345/349
[58] Field of Search ................... 395/600, 60; 345/348, 345/349; 707/100, 101, 102, 2

[56] References Cited

U.S. PATENT DOCUMENTS

| | | | |
|---|---|---|---|
| 5,079,723 | 1/1992 | Herceg et al. | 345/352 |
| 5,388,203 | 2/1995 | Kaneko | 345/349 |
| 5,390,296 | 2/1995 | Crandall et al. | 345/348 |
| 5,394,522 | 2/1995 | Sanchez-Frank et al. | 345/349 |
| 5,428,417 | 6/1995 | Lichtenstein | 353/122 |
| 5,454,101 | 9/1995 | Mackay et al. | 707/3 |
| 5,544,360 | 8/1996 | Lewak et al. | 707/1 |
| 5,611,074 | 3/1997 | Kantz et al. | 395/473 |

*Primary Examiner*—Thomas G. Black
*Assistant Examiner*—Greta L. Robinson
*Attorney, Agent, or Firm*—Richard A. Henkler; Andrew J. Dillon

[57] ABSTRACT

A method, apparatus, and article of manufacture direct a computer system to display files using a type identifiers and parent identifiers. The method includes the first computer-implemented step of in response to a command from user controls (e.g., clicking a mouse button to open a directory) to control a directory having files stored therein, locating in memory each file's type identifier. The second step includes locating in memory a parent identifier for each file, wherein each parent identifier identifies a file's parent application. The third step includes displaying each file using its parent application's icon. The fourth step includes building a unique border around each icon using the type identifier for each file, thereby displaying each file based on the type of the file.

10 Claims, 5 Drawing Sheets

METHOD, MEMORY AND APPARATUS FOR DESIGNATING A FILE'S TYPE BY BUILDING UNIQUE ICON BORDERS

CROSS-REFERENCE TO RELATED APPLICATION

The present invention appears to claim subject matter disclosed in prior co-pending application, Ser. No. 08/355,879, now U.S. Pat. No. 5,611,074, filed on Dec. 4, 1994.

BACKGROUND OF THE INVENTION

1. Field of the Invention

The present invention relates to graphical user interfaces (GUIs) and operating systems of computing systems and, more particularly, but not by way of limitation, to a method, article of manufacture, and apparatus for associating files with their type and parent application.

2. Background Information and Description of Related Art

Many conventional operating systems utilize file managers to organize files residing on internal storage of a computer system. A GUI allows a user to graphically view and manipulate those files as icons using a mouse. To identify the type of file (e.g., executable, bitmap, document, dynamic link), the name of each file contains a file type identifier, such as a name extension (e.g., example.exe). Conventional GUIs examine the identifier, search a look-up table generated by the file manager for the identifier, and then display an icon representing the file based on its type. For example, executable files may be represented by icon A, while documents may be represented by icon B. If the GUI does not find the file's type in the look-up table, it displays the file using a default icon (e.g., icon B).

Disadvantages and limitations of the above described file management system occur when the user and/or operating system merge files from two or more folders (directories) into one folder (directory), or when a single folder (directory) contains files from two or more software applications. For example, a directory that may contain files from many applications is a dynamic link library (DLL) directory. A DLL directory contains a collection of functional executable code (i.e., DLLs) from parent applications. A DLL cannot execute separately from its parent application. If an application must execute a function residing in a DLL(s), the application dynamically links to one of more of the DLLs, thereby enabling the parent application to load and execute the associated function(s).

FIG. 1 illustrates a prior art iconic view of window 60 for displaying various DLLs of a DLL directory. The conventional GUI assigns one icon type to all DLLs displayed in window 60. Therefore, the user cannot determine which DLLs, such as DLLs 62, 64 or 66, belong to application A (e.g., WordPerfect) or to some other application (e.g., Lotus 1, 2, 3). However, most software applications installed on a computer system include a bitmap file for identifying a unique icon for activating the application. For example, the WordPerfect 5.1 word processor and Lotus 1,2,3 software application each include a bitmap file for defining a unique icon of the respective application. Therefore, there is a need for an enhanced user interface and filemanager that allow a user to associate files with their parent application icons. In this manner, by simply viewing a file's icon, the user could determine which file belongs to which parent application.

SUMMARY OF THE INVENTION

In accordance with the present invention, a method, apparatus, and article of manufacture direct a computer system to display files using a parent identifier (e.g., icon) representing the file's parent and a type identifier (e.g., border surrounding the icon) representing a file's type (e.g., executable, document, bitmap, etc). The method includes the first computer-implemented step of in response to a command from user controls (e.g., clicking a mouse button to open a directory) to control a directory having files stored therein, locating in memory each file's type identifier. The second step includes locating in memory a parent identifier for each file, wherein each parent identifier identifies a file's parent application. The third step includes displaying each file using its parent application's icon. The fourth step includes building a unique border around each icon using the type identifier for each file, thereby displaying each file based on the type of the file.

DETAILED DESCRIPTION OF THE PREFERRED EMBODIMENT

The following detailed description is of the best presently contemplated mode for carrying out the invention. However, this detailed description is not to be viewed in a limiting sense, but is made merely for the purpose of illustrating the general principles of the invention, the scope of which is only defined by the appended claims.

Figure 1:
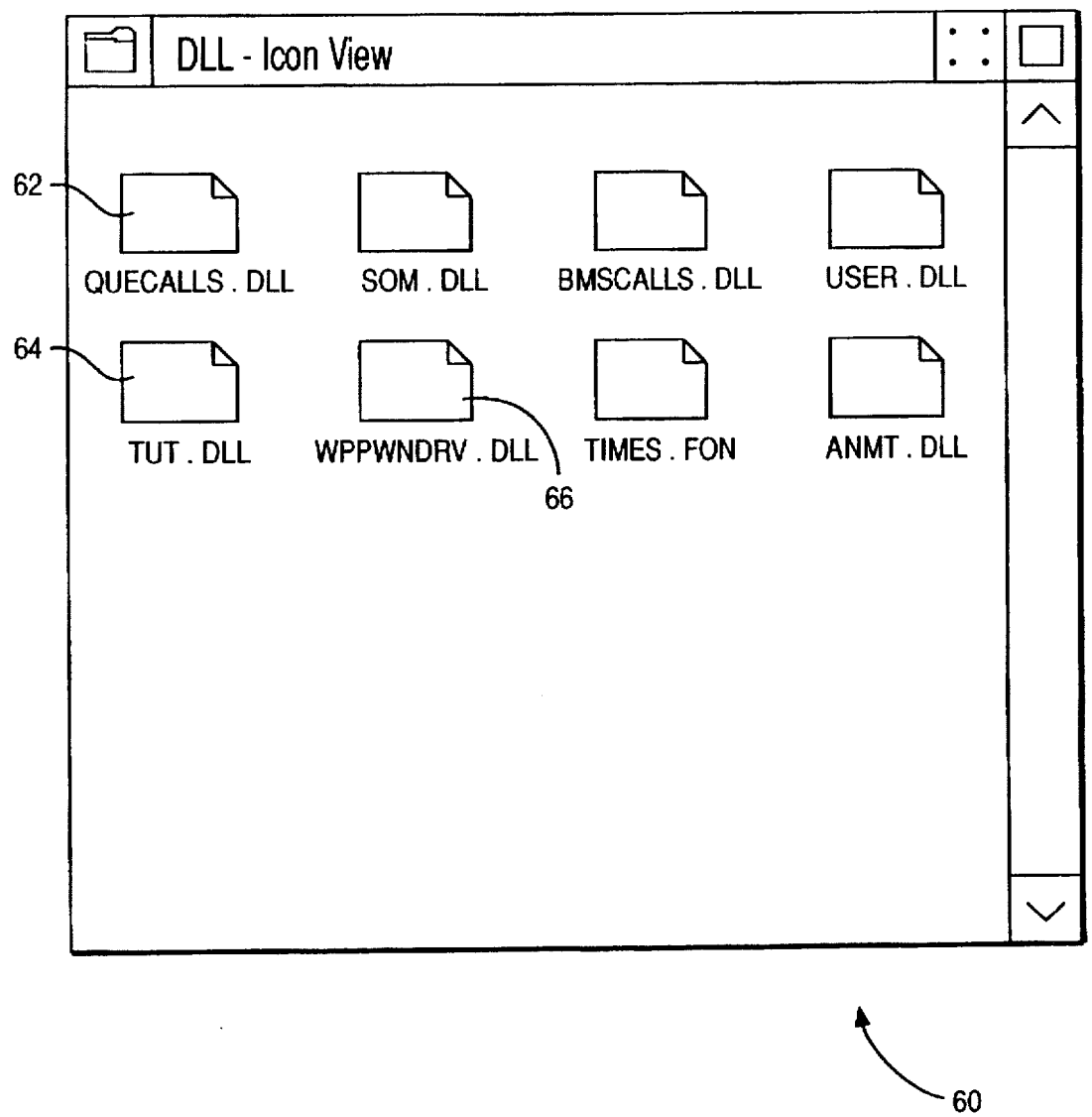
FIG. 1 illustrates a prior art iconic view of a window for displaying various DLLs of a dynamic link library using a conventional file management system.
Figure 2:
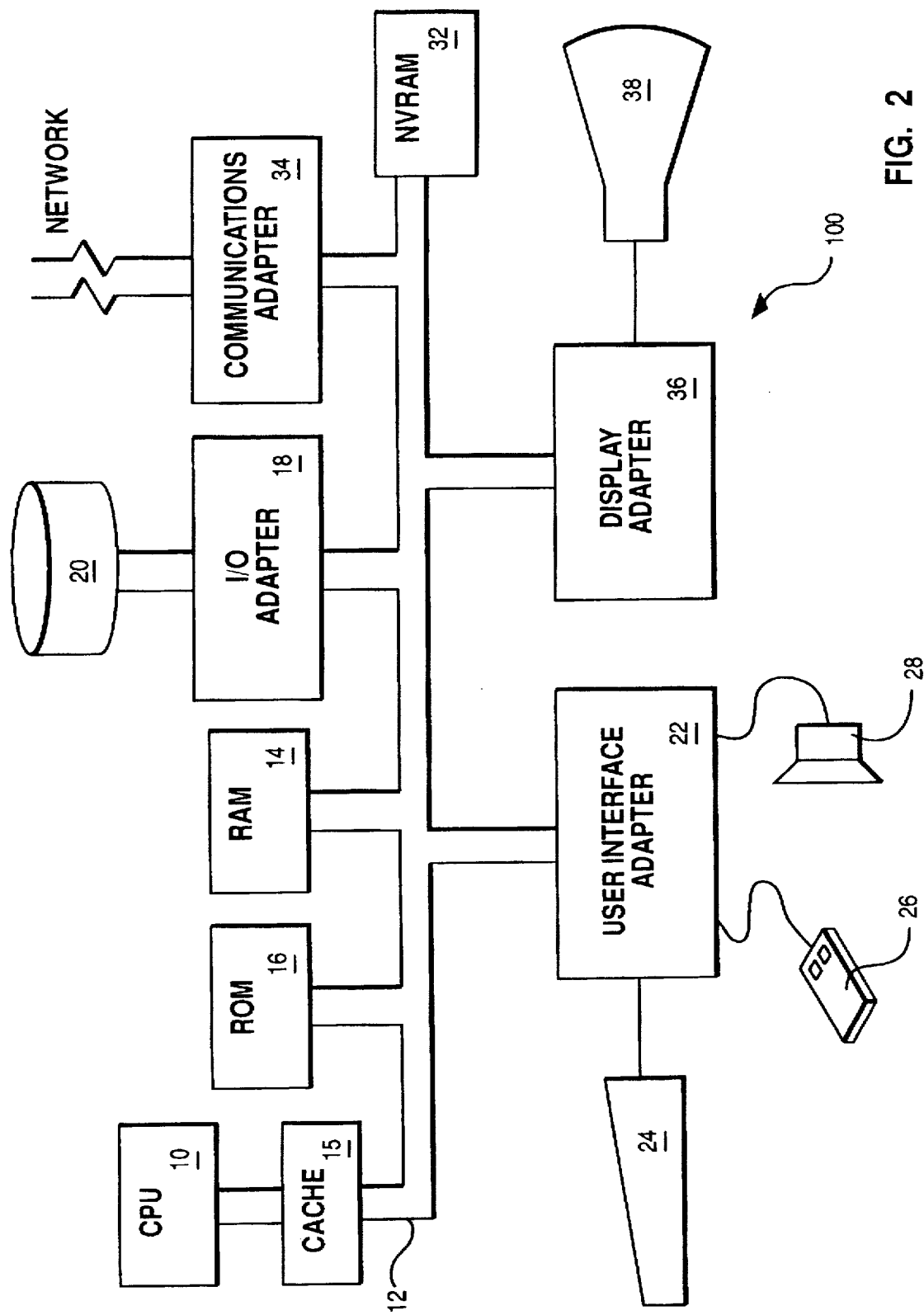
FIG. 2 illustrates a schematic diagram of an example hardware environment for implementing the present invention.

The preferred embodiment may be practiced in any suitable hardware configuration, such as computing system 10 illustrated in FIG. 2 or, alternatively, in a laptop or notepad computing system. Computing system 100 includes any suitable central processing unit 10, such as a standard microprocessor, and any number of other objects interconnected via system bus 12. For purposes of illustration, computing system 100 includes memory, such as read only memory (ROM) 16, random access memory (RAM) 14, cache 15, and peripheral memory devices (e.g., disk or tape drives 20) connected to system bus 12 via I/O adapter 18. Computing system 100 further includes display adapter 36 for connecting system bus 12 to display device 38. User interface adapter 22 connects system bus 12 to user controls, such as keyboard 24, speaker 28, mouse 26, or any other user input device (e.g.,a touch screen (not shown)).

One skilled in the art readily recognizes how a user utilizes a mouse and mouse cursor to initiate the manipulation of objects/files in a graphical user interface. For example, a user can drag and drop object/file icons in a window using a mouse and mouse cursor. Moreover, a user can open and/or close objects/files by positioning a mouse cursor over the icon and double-clicking one of the mouse's buttons (herein referred to as "double clicking").

A graphical user interface (GUI) and filemanager of the preferred embodiment reside within a computer-readable media and allow a user to initiate the manipulation of files. Any suitable computer-readable media may retain the GUI and filemanager, such as ROM 16, RAM 14, disk and/or tape drive 20 (e.g., magnetic diskette, magnetic tape, CD-ROM, optical disk, or other suitable storage media). Further, in the preferred embodiment, the GUI interfaces the user to the AIX™ operating system, while the filemanager resides within the AIX operating system. However, any suitable operating system or desktop environment could be utilized. While the GUI and filemanager merely instruct and direct CPU 10, for ease in explanation, the GUI and filemanager will be described as performing the following features and functions.

Figure 3:
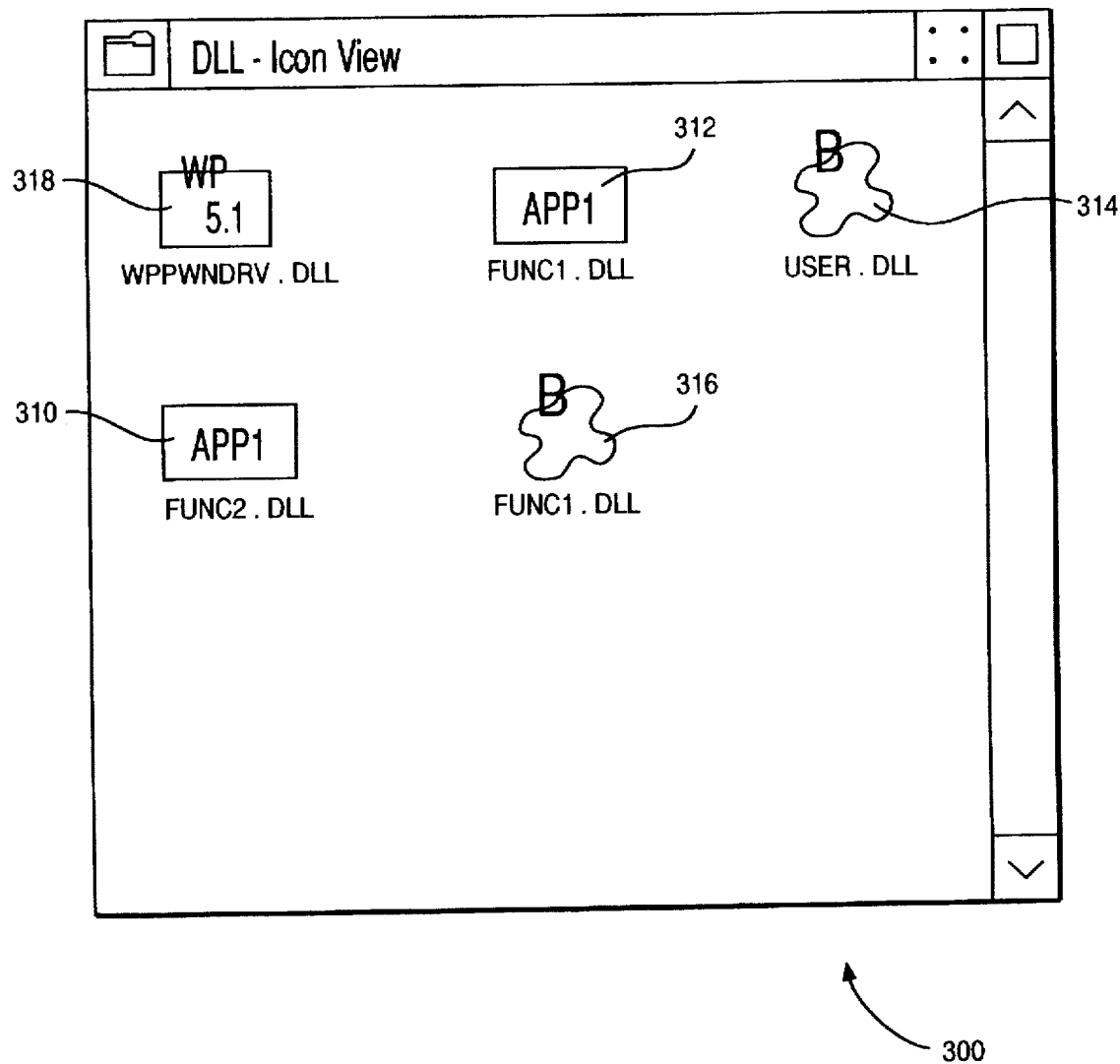
FIG. 3 illustrates a GUI display window for displaying various DLLs of parent applications using unique icons of those parent applications.

As previously described, most software applications installed on a computer system include a bitmap file for identifying a unique icon that facilitates the activation of those applications. The GUI and filemanager of the preferred embodiment use those unique bitmap files and, therefore, unique icons, to identify files belonging to specific applications. For example, FIG. 3 illustrates a GUI display window for displaying various DLLs of parent applications using unique icons of those parent applications. One skilled in the art readily recognizes that any type of application and/or icon of those applications could be utilized. Moreover, an equivalent non-graphical representation (e.g. text) could by utilized in place of the graphical iconic representation.

Referring again to FIG. 3, the GUI displays each DLL as an icon in window 300 using the unique bitmap file of the file's parent application. Therefore, by simply viewing DLL icon 318, the user knows that icon 318 belongs to the WordPerfect application. Further, by viewing DLL icons 314 and 316, the user knows that icons 314 and 316 are DLLs of the "D" application. Similarly, by viewing DLL icons 310 and 312, the user knows that icons 310 and 312 are DLLs of the "APP1" application.

Figure 4:
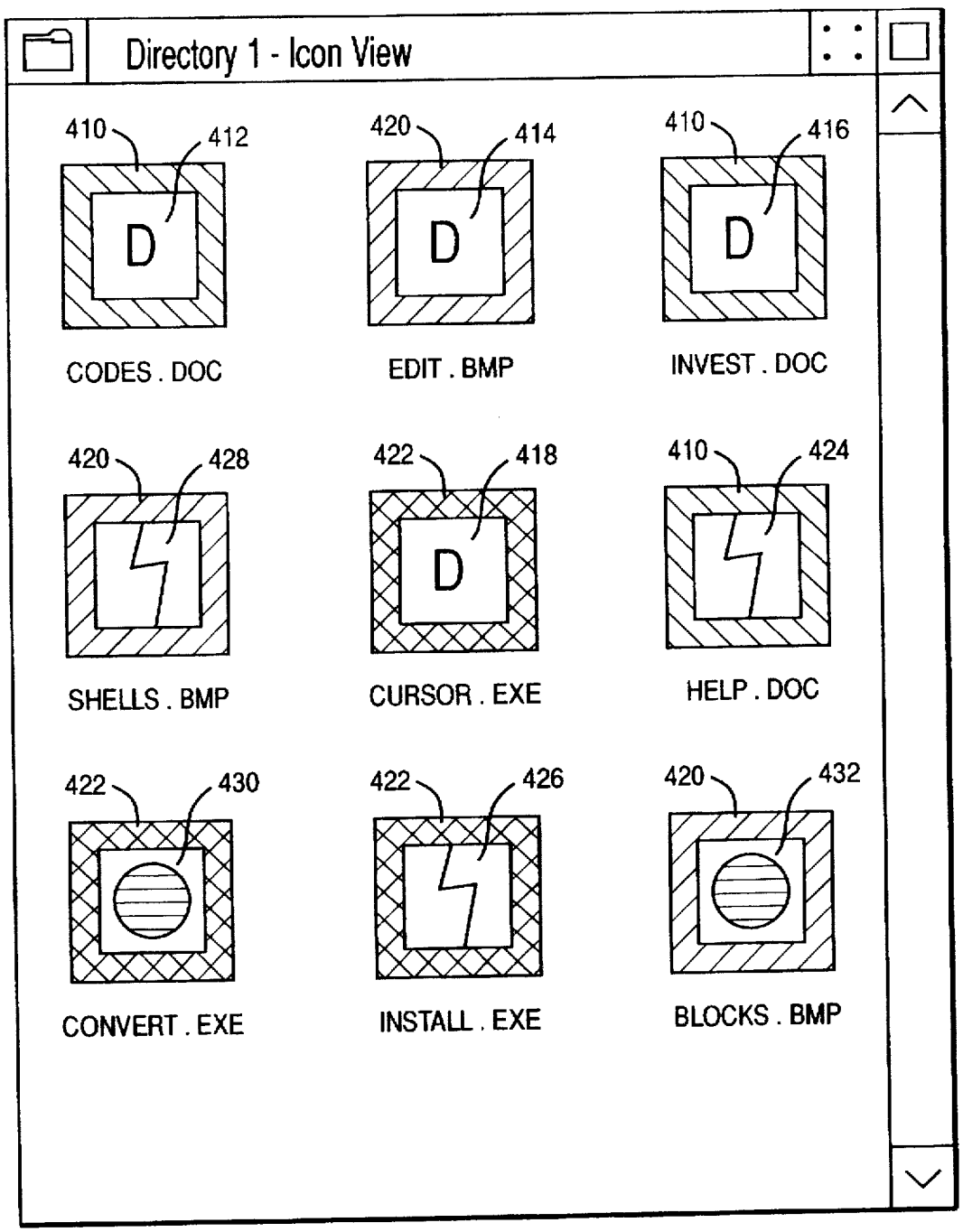
FIG. 4 illustrates a GUI display window for displaying a directory containing various files of parent applications, wherein each file is represented using a unique icon of its parent application.

Another example is shown in FIG. 4, which illustrates a GUI display window for displaying a directory containing various files of parent applications, wherein each file is represented using a unique icon of its parent application. Accordingly, the GUI displays each file as an icon using its parent applications's unique bitmap file. Therefore, by simply viewing the icons, the user knows that icons 412, 414, 416 and 418 are files of the "D" application. In the same manner, the user knows that icons 424, 426 and 428 are files of the another application. Similarly, the user knows that icons 430 and 432 are files of a third application.

Further, the user knows the file's type by viewing the border surrounding the icon (referred to as a "type indicator"). Border 410 indicates that the files represented by icons 416, 412 and 424 are documents. Border 420 indicates that the files represented by icons 414, 428 and 432 are bitmaps, while border 422 indicates that the files represented by icons 418, 426, and 430 are executables. However, one skilled in the art recognizes that other equivalent type indicators could be utilized to display the file's type.

Accordingly, the preferred embodiment allows the user to determine which file belongs to which parent application and to determine the file's type by simply viewing the icon and the border surrounding the icon.

Figure 5:
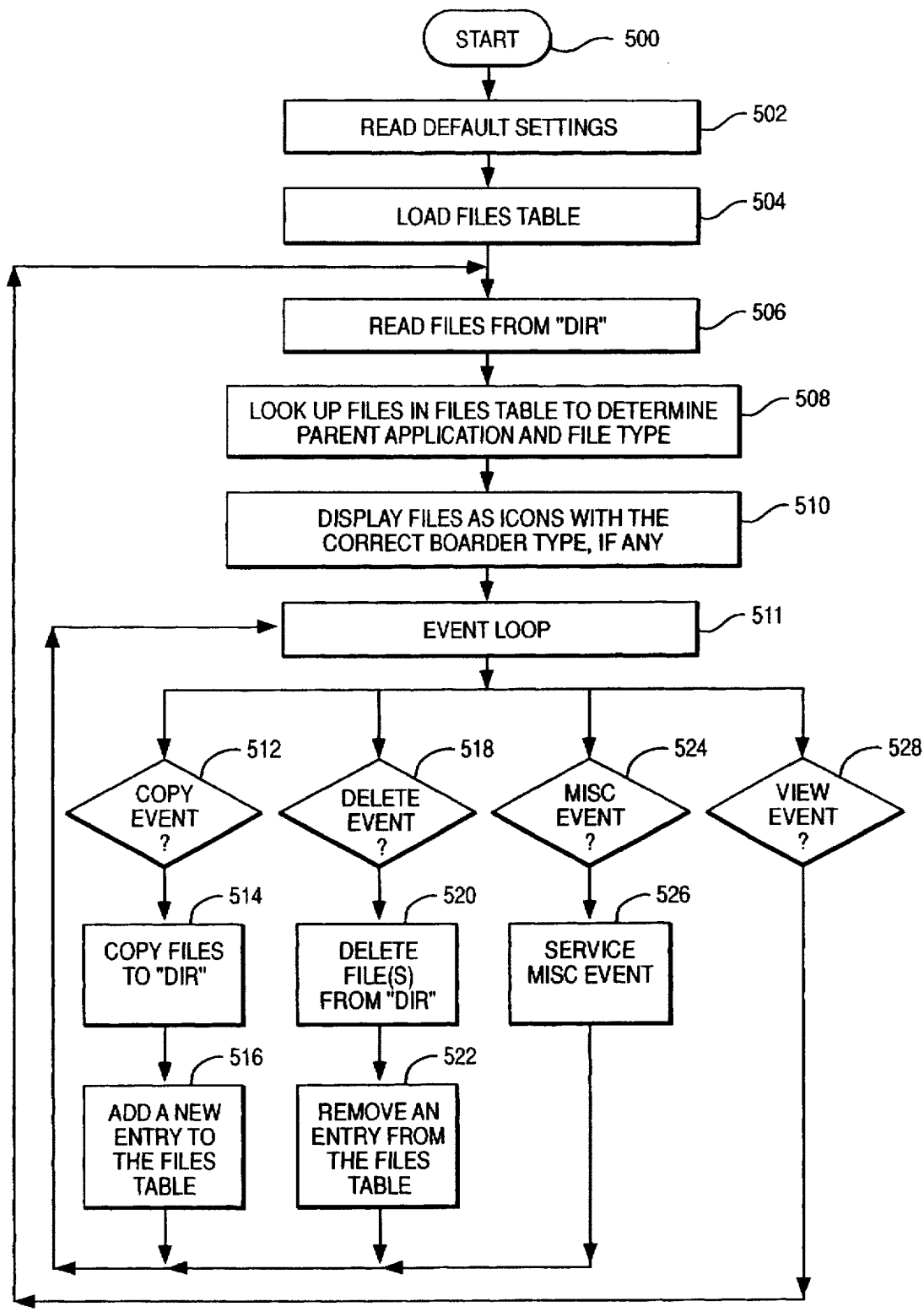
FIG. 5 is a flow chart illustrating detailed logic for implementing the preferred embodiment.

The GUI of the preferred embodiment directs the performance of the steps illustrated in the detailed logic of FIG. 5. At 500, a user or operating system starts a particular application by initiating the manipulation or viewing of files. The particular application could be, for example, the user double clicking over an icon to open a dynamic link library directory or open a directory containing files from several applications. At 502, the GUI loads from internal storage (e.g., a hard disk drive) into RAM 14 conventional default files (not shown). The default files include settings used to set the initial state of the GUI, such as, for example, a default directory, screen colors, window sizes, etc. If the default files contain a default directory, the GUI will display it when the application first runs without user parameters.

At 504, the GUI retrieves a file table (described in more detail herein) stored in internal storage and loads it into RAM 14. The filemanager of the operating system initially builds the file table and updates it each time the user adds a directory/application to internal storage. However, depending on the number of directories and files, the file table may be a master table that identifies the location of one or more file tables. In any event, the file table(s) contain path/name, signature, type, icon, origin and link field entries for each file residing within internal storage of the computer system. The filemanager assigns each file a unique signature (e.g., timestamp) identifying when it was installed and its version. Therefore, if two files have the same name, the unique signature will distinguish them. The type field may be an extension to the name (e.g. example.exe) and identifies the file's type, such as executable, document, bitmap, etc. The icon field is merely a pointer to a location of the parent application's bitmap file. The GUI uses the application's bitmap file to display files belonging to that application. The origin field identifies the version of the file and the name of its parent application. The link field identifies the location and number of any duplicate copies of the file. The path/name field identifies the directory(ies) that the file belongs to. A representative file table is shown in Table A below:

TABLE A

| Files | Signature | Type | Icon | Origin | Link |
| --- | --- | --- | --- | --- | --- |
| Path/Name1 | hhmmssMMDDYYYY | exe | Prod. Ico | Prod & Ver | # + path |
| Path/Name2 | hhmmssMMDDYYYY | doc | Prod. Ico | Prod & Ver | # + path |

At 506, the GUI reads from internal storage the filename for each file in the default directory. The filemanager previously appended to those filenames a unique signature, such as a timestamp, and a type indicator (e.g., filename extension). Therefore, each filename includes an extension and signature. If the user did not identify a default directory in the default files, then a home directory will be used as the default directory. At 508, using the filenames of each file read in the default directory, the GUI scans the files table to locate the files in the files table. The GUI then retrieves from the icon field in the files table a pointer to a parent application's bitmap file. Accordingly, at 510, the GUI displays each file as an icon using the bitmap file identified in the file's icon field. However, if the filename of a file is not found within the files table, the GUI displays the file using a conventional generic icon.

Further, the GUI retrieves the file's type from the type field. Next, the GUI scans a type field in a second table, illustrated in Table B below, for the file's type.

TABLE B

| TYPE | BORDER |
| --- | --- |
| exe | Bord1.Ico |
| doc | Bord2.Ico |
| bitmap | Bord3.Ico |

If found, the GUI reads the border field of the same row as the located type. The border field contains a pointer to a second bitmap file located in memory. The GUI executes the second bitmap field, thereby drawing a unique border around the icon according to the file's type. If the file's type is not found in the Table B, the GUI assigns the file a conventional generic border. Alternatively, the GUI could fail to display a border.

Next, at 511, an event loop is processed. At 512, if the GUI detects a copy event, wherein the user desires to copy a file, at 514, the GUI copies the file into the directory on internal storage. At 516, the GUI adds a new entry to the link field indicating another copy of the file and its location.

At 518, if the GUI detects that the user desires to delete a file from the directory, at 520, the GUI deletes the file from the directory on internal storage. At 522, the GUI removes the its from the link field, or if there is only one copy, removes the entire entry from the file table. At 524, if other miscellaneous events occur, at 526, they are processed. Control returns to 511. At 528, if the GUI detects that the user desires start a new application (e.g., view a new directory), control returns to 506.

The other fields in the file table allow a user to perform unique searches. For example, the origin field allows the user to identify all files belonging to a particular application. Therefore, if the user typed a command to show all Word-Perfect files, the GUI would search the origin field of all files in the files table for "WordPerfect". Similarly, the link field allows the user to identify all copies of a particular file. The type field allows the user to identify all files of a particular type (e.g., all executables).

While the invention has been shown and described with reference to particular embodiments thereof, it will be understood by those skilled in the art that the foregoing and other changes in form and detail may be made therein without departing from the spirit and scope of the invention. For example, the preferred embodiment describes the filemanager as building a file table for files residing only on internal storage. However, one skilled in the art readily recognizes that the filemanager could build a file table that includes files from external storage, such as CD-ROMs, tape drives, etc.

What is claimed is:

1. A method for directing a computer system to display files using type identifiers and parent identifiers, comprising the steps of:

in response to a command from user controls to control a directory having files stored therein, locating in memory the type identifier for each file, wherein each type identifier identifies a type of the file from a table including: document-type files; executable-type files; and bitmap-type files;

in response to the command from user controls to control the directory having files stored therein, locating in memory a parent identifier for each file, wherein each parent identifier identifies a parent application of the file;

displaying each file as an icon of the parent application of each file; and building a unique border around each icon using the type identifier for each file, thereby displaying each file according to the type of the file.

2. The method according to claim 1 further comprising the steps of:

locating a first bitmap file for each group of files in memory belonging to one parent, wherein the first bitmap file defines the parent identifier of the parent application of each file;

locating a second bitmap file for each file, wherein the second bitmap file defines the type identifier of the file; and displaying each file using the first and second bitmap files.

3. The method according to claim 2 wherein the parent identifier is an icon of the parent application and the second bitmap file defines the border surrounding the icon.

4. The method according to claim 2 wherein a pointer to each first bitmap file is stored in a first table in memory and a pointer to each second bitmap file is stored in a second table in memory.

5. The method according to claim 4 wherein the first table contains a unique filename for each file in the directory.

6. The method according to claim 5 wherein the unique filenames each contain a unique signature.

7. The method according to claim 6 wherein the unique signature is a time stamp.

8. The method according to claim 1 further comprising the steps of:

creating a first table comprising a filename, path, type, and icon field for each file wherein said type specifies a file type for each file from a table including: document-type file; executable-type file; and bitmap-type files;

in response to the command from user controls to control the directory, searching storage for filenames, wherein each filename represents one file in the directory;

searching the filename field of the first table for each filename;

in response to locating a filename in the first table, reading the icon field for a pointer to a first bitmap file for the located filename, wherein the first bitmap file defines an icon;

in response to locating a filename in the table, reading the type in the type field;

searching a second table for the type;

in response to locating the type in the second table, reading from the second table a pointer to a second bitmap file that defines a border; and displaying the icon with a border to identify the type.

9. A computer system for displaying files using type identifiers and parent identifiers comprising:

memory;

user controls;

in response to a command from user controls to control a directory having files stored therein, a processor for locating in memory the type identifier for each file, wherein each type identifier identifies a type of the file from a table including: document-type files; executable-type files; and bitmap-type files;

in response to the command from the user controls to control the directory having files stored therein, the processor for locating in memory a parent identifier for each file, wherein each parent identifier identifies a parent application of a file;

a display for displaying each file as an icon of the parent application of each file; and the display for displaying a unique border around each of the icons using the type identifier for each file, thereby displaying each file based on the type of file.

10. An article of manufacture comprising a computer usable medium having computer readable program code means embodied therein for causing a computer system to display files using parent and type identifiers, comprising:

in response to a command from user controls to control a directory having files stored therein, computer readable program code means for causing the computer system to locate in memory the type identifier for each file, wherein each type identifier identifies a type of the file from a table including: document-type files; executable-type files; and bitmap-type files;

in response to the command from user controls to control the directory having files stored therein, computer readable program code means for causing the computer system to locate in memory a parent identifier for each file, wherein each parent identifier identifies a parent application of a file;

computer readable program means for causing a display of the computer system to display each file as an icon of the parent application of each file; and computer readable program means for causing the display to display a unique border around each icon using the type identifier for each file, thereby displaying each file based on the type of the file.

* * * * *

UNITED STATES PATENT AND TRADEMARK OFFICE
CERTIFICATE OF CORRECTION

PATENT NO. : 5,797,139
DATED : August 18, 1998
INVENTOR(S) : Amro

It is certified that error appears in the above-identified patent and that said Letters Patent is hereby corrected as shown below:

Column 1, Line 9: Please change "Dec. 4, 1994" to --Dec. 14, 1994--

Signed and Sealed this

Fifth Day of January, 1999

Attest:

Attesting Officer

Acting Commissioner of Patents and Trademarks